United States Patent [19]

Henry

[11] Patent Number: 4,826,380
[45] Date of Patent: May 2, 1989

[54] PRE-CAST SEALANT DOME AND METHOD
[75] Inventor: Winston L. Henry, Mesquite, Tex.
[73] Assignee: LTV Aerospace & Defense Company, Dallas, Tex.
[21] Appl. No.: 145,086
[22] Filed: Jan. 19, 1988
[51] Int. Cl.$^4$ .............................................. F16B 37/14
[52] U.S. Cl. ...................................... 411/377; 411/82; 411/258; 411/429; 411/910; 156/229; 156/294; 156/295; 264/268; 264/271.1; 29/458
[58] Field of Search ................... 411/82, 258, 372, 377, 411/429, 431, 910; 264/268, 271.1; 29/458; 156/91, 145, 229, 286, 293–295

[56] References Cited

U.S. PATENT DOCUMENTS

| | | | |
|---|---|---|---|
| 2,710,113 | 6/1955 | Pritchard | 411/915 X |
| 3,470,787 | 10/1969 | Mackie | 411/377 |
| 3,992,339 | 11/1976 | Harlan, Jr. et al. | 524/91 |
| 4,092,296 | 5/1978 | Skiff | 522/403 X |
| 4,382,049 | 5/1983 | Hofmeister et al. | 264/268 X |
| 4,400,123 | 8/1983 | Dunegan | 411/431 X |
| 4,519,974 | 5/1985 | Bravenec et al. | 249/117 X |

Primary Examiner—Gary L. Smith
Assistant Examiner—Douglas E. Ringel
Attorney, Agent, or Firm—J. M. Cate; S. S. Sadacca

[57] ABSTRACT

A pre-cast dome-like shell is loaded with a predetermined amount of curable sealant. The sealant and dome are similar in composition. The dome is pressed over the exposed end of a fastener. An elastic portion of the shell can expand, thereby increasing the internal volume of the shell to accommodate small variations in sealant amount. A close fit between the shell and fastener, combined with an adequate shell wall, insure proper shell orientation and barrier thickness.

16 Claims, 1 Drawing Sheet

PRE-CAST SEALANT DOME AND METHOD

The Government has rights in this invention pursuant to Contract No. F 33657-81-C-0067 awarded by the United States Air Force.

FIELD OF THE INVENTION

This invention pertains to the protective sealing of fasteners, and more particularly to using an adhesive sealant with a pre-cast dome which is made from the same sealant material, thereby electrically insulating and otherwise protecting the fasteners.

BACKGROUND ART

Fasteners used in the manufacture of aircraft are exposed to stress, corrosive fluids and, potentially, to electrical current. Owing to these factors, polymeric sealants have been applied to aircraft fasteners. One rather elaborate method is disclosed in U.S. Pat. No. 2,710,113, issued to P. J. Prichard on June 7, 1955. The method in this patent involves the deposition of a first rubber-like sealant layer over the fasteners followed by the application of a dome having a hole in it over the first layer of sealant. Excess sealant and air is said to exit the hole, whereupon another layer of sealant is applied. In actuality, unwante air was known to have been retained by this type of method.

Some methods involve the injection of sealant into a mold or into the space formed betweeen a dome and a fastener. Other methods require precise metering of sealant either around fasteners prior to dome placement, or into a dome before placement over fasteners. Such known prior art methods are either costly, impractical or inconsistent in the quality of the result. The present invention is addressed to overcoming the deficiencies of the prior art fastener sealing methods and products.

SUMMARY OF THE INVENTION

The present invention is directed to a protective and insulating seal for a fastener which protrudes from a workpiece. The seal includes a pre-cast continuous and uninterrupted shell having a base portion defining a mouth opening into a central cavity. The shell or dome may be filled with a curable sealant which is made from the same material as the shell. The shell is dimensioned so that it may be placed over the exposed portion of a fastener extending from a workpiece with the final thickness of the sealant and shell meeting the specifications required for thickness of sealant over an exposed fastener. The shell is provided with a top portion having a reduced thickness which may expand slightly upon application of pressure on the shell as it is seated over the fastener. This expansion results in a slight increase in volume of the cavity within the shell thereby permitting excess sealant to be accomodated within the shell.

The present invention provides a protective and insulating seal for fasteners which is economical and practical and which requires less employee training than prior art methods. Similarly, the present invention provides a faster installation which does not require injection equipment or complex tools. The invention provides a structurally and chemically stable protection to a fastener which does not retain and an insulation which automatically conforms to protective thickness specifications. The sealant dome of the present invention provides a professional appearance to the finished product while minimizing squeeze out of excess sealant.

DESCRIPTION OF THE PREFERRED EMBODIMENT

Figure 1:
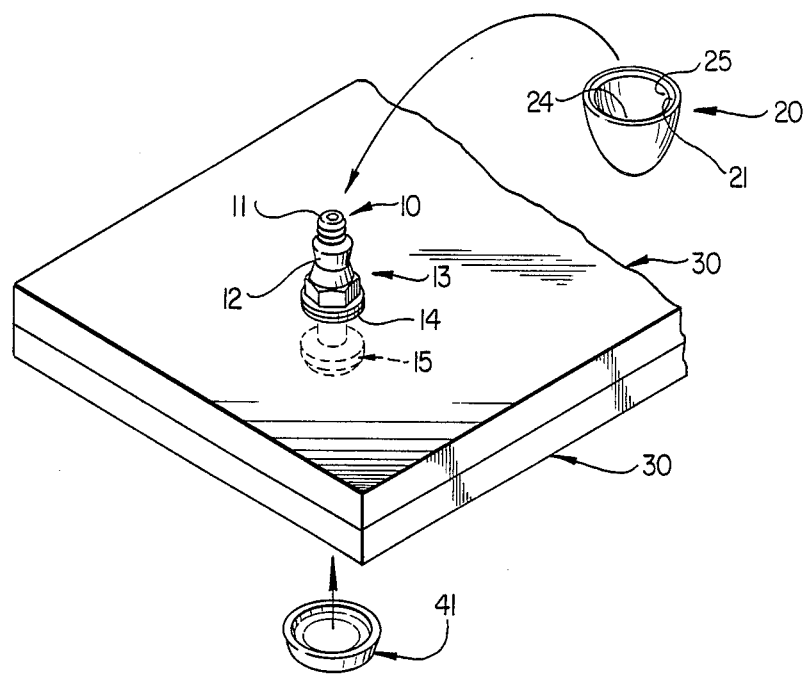
FIG. 1 is a perspective view showing the pre-cast dome of the present invention prior to installation on a fastener.

FIG. 1 illustrates an aircraft fastener 10, used to attach several sheets 30 together, with a pre-cast shell-like elastomeric dome 20 positioned prior to installation. The fastener includes a threaded bolt 11, a nut 12 and in the illustrated example, two washers 13, 14. Bolt 11 has a head 15.

Figure 2:
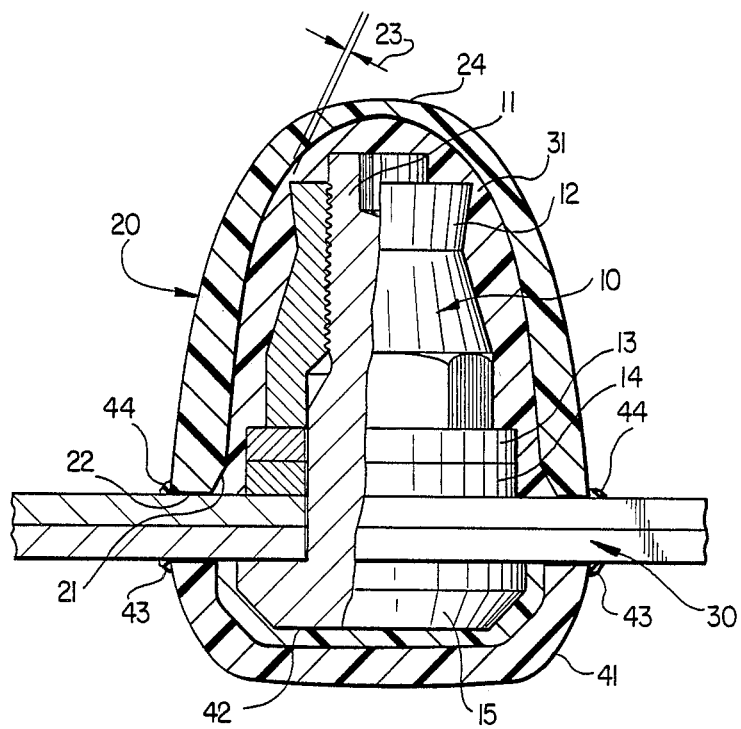
FIG. 2 is a partial section view showing the fastener with the protective pre-cast dome in place.

FIG. 2 illustrates the pre-cast dome or shell in its installed position over the end of fastener 10 which extends to one side of one of the sheets 30. Dome 20 surrounds the threaded end of the fastener and seats against sheet 30. The pre-cast dome is an oven cured or accelerated polymer. This results in improved toughness and abrasion resistance. A bevel 21 is formed on the inside edge of the mouth of dome 20 which defines an interior cavity 25.

In the final installed position, a predetermined gap 23 is provided between the inside surface of the dome and the fastener. The sidewall thickness of the dome is also predetermined so that even in the event that the dome is placed in the position of maximum eccentricity with respect to the fastener, the total minium protective barrier thickness still meets the required specification. For nearly all fastener sizes, a 0.025 inch (6.35 mm) clearance between the fastener and the inside surface of the dome cavity is used. The final wall thickness of the assembly is generally 0.25 inches (0.635 mm) measured from the outermost dimension of the washerss, and 0.12 inches (3.05 mm) measured from the top of the fastener. The dome is provided with a top portion 24 of reduced thickness, the purpose of which will be explained below. For a #8 fastener, the base diameter is 0.85 inches (21.59 mm), the height of the dome is 0.75 inches (19.05 mm) arid the reduced portion 24 is 0.05 inches (1.27 mm).

An air-free sealant layer 31 occupies the space between the dome and the fastener. A 1058 type 2B2 sealant conforming to MIL SPEC 8802 is known to be a suitable sealant. Test trials have shown that sealants having a designated B2 viscosity provide optimum adherence without being too runny or promoting air entrapment. The structural integrity of the final assembly is enhanced by casting the dome from the same sealant.

A pre-cast cap 41 covers the head 15 of the fastener, and a sealant layer 42 occupies the space between head 15 and cap 41. As a result of the method of installation, a small bead of sealant 43, 44 may be formed around both the dome and cap.

The preferred method for applying the pre-cast dome of the present invention begins with the cleansing of the fastener with an abrasive pad and MEK solvent. Once clean, and adhesion promoter such as PR148 is applied to and around the fastener. A brush coat of 1057 class A1/2 sealant is then applied to the fastener and allowed to dry for about 30 minutes. A fine adhesive pad is then used to roughen up the inside of the dome to be applied. The dome 20 is then cleaned with MEK solvent, inside and out. Type PR148 adhesion promoter is applied to the inside and base of the dome and allowed to dry for 15 minutes.

Sealant (1048 type 2B2) is injected into the dome cavity. The sealant has a viscosity which promotes an air-free layer between the fastener and dome while not being runny. The amount of sealant is predetermined, in accordance with the squeeze-out that is desired. In general, the sealant amount is equal to or slightly more than the void volume between the seated dome and the fastener. A small amount of squeeze-out can usually be tolerated. For a #8 fastener dome weighing 3.3 grams, 2.5 grams of sealant is adequate. The dome is then pushed over the fastener and held in place for five seconds, while turning alternately clockwise and counterclockwise. Turning promotes distribution of sealant evenly, particularly around the base of the dome. After 2 to 4 minutes, the dome is again pressed and rotated.

As is seen in FIG. 2, dome 20 has a reduced thickness top section 24 which is thin relative to the remaining dome side wall thickness. In the preferred embodiment shown, this local reduced thickness permits the dome to expand slightly upon application of pressure on the dome as it is seated over the fastener. This expansion results in a slight increase in volume of the cavity thereby permitting excess sealant to be accommodated within the dome. In the preferred embodiment shown, the reduced thickness section is disposed about the axis of symmetry of the dome.

The method of applying cap 41 is substantially the same as that used to apply dome 20. Although cap 41 is not shown with a reduced thickness portion, it will be understood that it may be so designed to provide the benefit described above with respect to dome 20.

Thus, the present invention provides a protective and insulating seal for a fastener used in aircraft and other manufacturing where a sealant must be applied over the fastener. In the present invention, the seal includes a continuous and uninterrupted dome or shell having a mouth at the base thereof which defines an opening to a central cavity within the shell. The shell has a sidewall with a portion thereof having a reduced thickness when compared to the remainder of the shell. In the preferred embodiment, the portion of the reduced thickness is disposed about the axis symmetry of the fastener. This reduced thickness permits the dome to expand slightly upon application of pressure on the dome as it is seated over the fastener. Thus, the internal volume of the dome changes from a first or resting volume, to a second or expanded volume. This increase in volume of the interior cavity thereby permits excess sealant to be accommodated within the dome and thereby reduces the amount of material which is squeezed out during use of the present invention.

Although a preferred embodiment of the invention has been described in the foregoing detailed description and illustrated in the accompanying drawings, it will be understood that the invention is not limited to the embodiment disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

What is claimed is:

1. A protective and insulating seal for a fastener, the seal comprising:
   a continuous and uninterrupted shell having a base portion surrounding an opening into a central cavity and a portion of reduced wall thickness;
   the central cavity containing a polymeric sealant which adheres the shell over the fastener; and wherein
   the portion of reduced wall thickness is integral with the shell and is extensible from a first position to a second position, whereby the volume of the cavity changes from a first volume to a second volume.

2. The seal of claim 1 wherein:
   the portion of reduce wall thickness is disposed about the axis symmetry of the fastener.

3. The seal of claim 1 wherein:
   the shell is an accelerated polymer.

4. A protective and insulating seal for a fastener comprising:
   a pre-cast continuous and uninterrupted shell, said shell defining an opening into a central cavity and having a portion of reduced wall thickness;
   a curable sealant for adhering the shell over the fastener, said sealant and shell being of the same material composition; and
   the portion of reduced wall thickness responding to pressure changes in the cavity by changing from a resting position to an elastically deformed position.

5. The seal of claim 4 wherein:
   the portion of reduced wall thickness is integral with the shell; and
   the shell further comprises a chamfer leading into the cavity.

6. A protective and insulating seal for a fastener which protrudes from a workpiece, the seal comprising:
   a pre-cast continuous and uninterrupted shell, said shell having a base portion surrounding an opening into a central cavity;
   the shell further comprising a means for pressure compensation; and
   a curable adhesive means for sealing the shell over the fastener, said adhesive means for sealing having a viscosity to promote an air-free layer between the fastener and the shell without being runny;
   said means for pressure compensation comprising a portion of reduced wall thickness in said shell adapted to elastically deform from a first resting position to a second position.

7. The seal of claim 6 wherein:
   the second position is an expanded position, whereby in the expanded position the volume of the cavity is increased.

8. The seal of claim 7 wherein:
   said shell and means for sealing have substantially the same material composition.

9. The seal of claim 6 or 8 wherein:
   the interior dimensions of the activity closely conform to the dimensions of the fastener portion covered by the shell and whereby when the base is flush with the workpiece, a minimum predetermined protective thickness is provided by the shell, irrespective of the misalignment of the shell with respect to the fastener.

10. A method for installing a pre-cast protective cover to a fastener on a workpiece, the method comprising:
    establishing a minimum protective thickness required around the fastener;
    selecting a continuous and uninterrupted shell having a flat base, lateral walls an elastically resilient end portion of reduced wall thickness and a central cavity, the lateral walls providing substantially all of the required protective thickness, the cavity dimensions closely conforming to the dimensions of the fastener, and the end portion deformable from a first to a second position;

metering an amount of curable sealant into the cavity for adhering the shell over the fastener, the amount substantially equal to or slightly more than the void volume in the cavity when the shell covers the fastener and the base rests flatly against the workpiece; and pressing the sealant containing shell over the fastener thus deforming the end portion from the first to the second position.

11. The method of claim 10 further comprising the step of applying an adhesion promoter around the fastener prior to pressing on the shell.

12. The method of claim 11 further comprising the step of applying an adhesion promoter to the cavity and base prior to metering the sealant into the cavity.

13. The method of claim 12 wherein:
the step of pressing the shell over the fastener comprises rotating the shell over the fastener.

14. A method for installing a pre-cast protective cover to a fastener on a workpiece comprising:

metering a predetermined amount of adhesive sealant into a pre-cast dome-like protective shell having a local expansible portion; p1 expanding the dome-like shell by pressing the sealant containing shell over a fastener; and allowing the sealant to cure while the shell is in an expanded state to adhere the shell over the fastener.

15. The method of claim 14 further comprising:
using a sealant which is substantially similar in material composition to the dome.

16. The method of claim 15 further comprising the step of:
curing the dome prior to use by passing it through an accelerated cure.

* * * * *